Aug. 4, 1970     E. F. KILPATRICK ET AL     3,522,655
APPARATUS AND METHOD FOR DETERMINING THE CORRELATION
COEFFICIENT OF TWO GRAPHICAL TRACES
Filed Oct. 2, 1967

INVENTORS.
JOHN BEMROSE, deceased
by ELSIE HILDEGARD
BEMROSE, Administratrix
ELLEN F. KILPATRICK BY McLean, Morton & Boustead
ATTORNEYS.

United States Patent Office 3,522,655
Patented Aug. 4, 1970

3,522,655
APPARATUS AND METHOD FOR DETERMINING THE CORRELATION COEFFICIENT OF TWO GRAPHICAL TRACES
Ellen F. Kilpatrick, Tulsa, Okla., and John Bemrose, deceased, late of Tulsa, Okla., by Elsie Hildegard Bemrose, Tulsa, Okla., assignors to Sinclair Research, Inc., New York, N.Y., a corporation of Delaware
Filed Oct. 2, 1967, Ser. No. 672,397
Int. Cl. G06g *3/00*
U.S. Cl. 33—1                                                     7 Claims

ABSTRACT OF THE DISCLOSURE

An apparatus for and a method of determining the correlation coefficient $\rho(x, y)$ of two graphical traces, $x$ and $y$. A horizontal reference line is located through each trace, for example at its mean value. One trace is mounted horizontally upon a slider movazle within the body of the correlation apparatus, and the other trace is mounted horizontally directly on the body of the instrument, above the slider. The slider is moved to vertically align the traces at what appears to be good correlation. A plurality of equispaced reference points are located along the traces. At each reference point the two traces are deemed to correlate if they both lie on the same side of their reference line. If they lie on opposite sides, they are deemed not to correlate. The correlation coefficient $\rho(x, y)$, is then given by $$\rho(x, y) = \sin \frac{[\pi(N_1 - N_2)]}{[2(N_1 - N_2)]}$$

Figure 1:
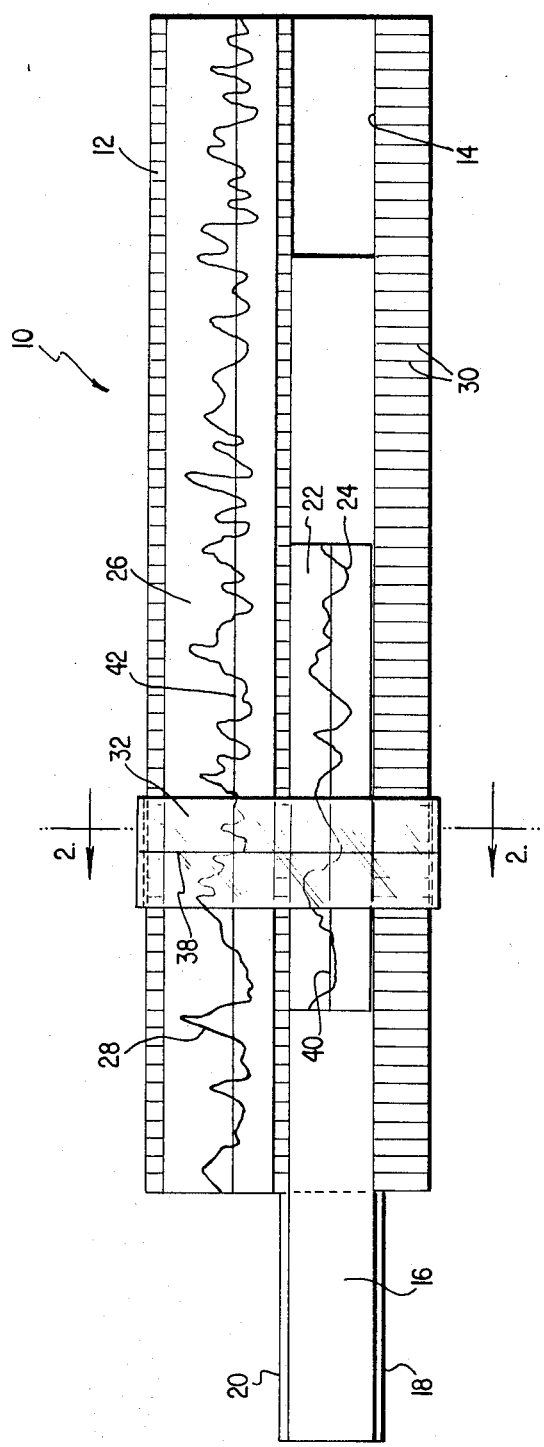

where $N_1$ is the number of reference points at which the traces correlate and $N_2$ is the number of reference points at which the traces do not correlate.

DESCRIPTION OF THE INVENTION

Numerous analytical testing and evaluation procedures include the development and interpretation of a graphical trace. By way of example, electrocardiograms, X-ray diffraction analyses, and the processing of seismic data frequently include the making and analysis of graphical traces. Such an analysis often includes determination of correlation between the graphical trace and a known or reference pattern. Such analysis permits the determination of the degree of correlation or the degree of deviation of the test or sample trace with the reference pattern. Then the degree of correlation of several traces can be compared by comparing their correlation coefficients. In like manner, a given test trace can be compared with several reference patterns to determine the reference pattern to which it bears the highest degree of correlation. In such instances the determination of a correlation coefficient permits the necessary determinations to be made.

Numerous mathematical formulae exist for the determination of the correlation coefficient between two variables. In general, these formulae are extremely complex, and a great expenditure of time and energy is required to develop a correlation coefficient from them. Thus, the correlation coefficient $\rho(x, y)$ between two probability variables $x$ and $y$ is given by:

$$\rho(x, y) = \frac{1}{\sigma x \sigma y} \int_{-\infty}^{+\infty} \int_{-\infty}^{+\infty} xy P(x, y) dx dy$$

where $\sigma x^2$ and $\sigma y^2$ are the variances of $x$ and $y$ respectively, and $P(x, y) dx dy$ represents the probability that any particular $x$ and $y$ are in the ranges $x \sim (x+dx)$ and $y \sim (y+dy)$. To calculate the correlation coefficient according to this definition is indeed a laborious work.

The present invention is an apparatus and a method for determining the correlation coefficient of two graphical traces from the observation of the frequency with which the two traces deviate in like direction from their respective mean values. The apparatus and method permit a rapid and simple determination of the correlation coefficient $\rho(x, y)$ of the two graphical traces.

A complete appreciation of the aspects and advantages of the present invention can be obtained from the following detailed description and claims, particularly when read in conjunction with the accompanying drawings in which like parts bear like reference numerals.

In the drawings:
FIG. 1 is a plan view of the correlation measuring apparatus of the present invention; and
FIG. 2 is a sectional view taken along line 2—2 of FIG. 1.

Figure 2:
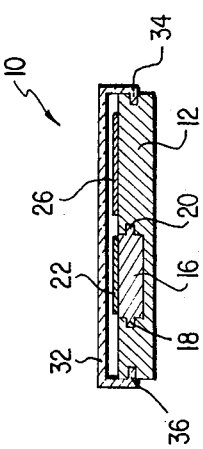

The correlation measuring apparatus of the present invention is generally indicated by reference numeral 10 in FIGS. 1 and 2. Long thin rectangular body 12 has a longitudinal recess 14 in its upper surface. Slider 16 fits within recess 14 and is held in place by flanges 18 and 20 which mate into grooves in body 12. Thus slider 16 can move longitudinally with respect to body 12.

The sample graphical trace to be correlated is drawn upon paper strip 22. Thus, in FIG. 1, a function $x$ is represented by graphical trace 24, drawn on paper strip 22. Strip 22 is mounted upon slider 16 and is held in place by suitable means (not shown) such as masking tape, clips, or soft paste. In FIG. 1, the strip 22 containing the sample graphical trace 24 is depicted as having a length considerably less than the length of slider 16. However, strip 22 might be of any length up to the length of slider 16, and in the event the graphical trace to be correlated is of a length greater than the length of slider 16, then the strip 22 can be cut into suitable sections to be individually correlated. Trace 24 might be the output of an oscillograph, by way of example.

Paper strip 26 containing a reference graphical trace 28 is mounted upon the surface of body 12 above the slider 16. Reference graphical trace 28 might represent a function $y$ obtained as data from a previous test as a standard reference trace, or as any other suitable source of reference data. Paper strip 26 is likewise held to body 12 by any suitable means such as masking tape, clips, or soft paste. If a standard reference graphical trace is utilized as graphical trace 28, then it might be permanently marked on the surface of body 12, rather than attached to it by means of paper strip 26.

The length of body 12 is divided into a large number of equally spaced divisions by vertical lines 30 which are spaced a short distance apart, for example, a spacing of $\frac{1}{10}$ inch apart. Thus each vertical line 30 establishes a reference point along the length of body 12. The vertical lines 30 are partially covered by strips 22 and 26, but if strips 22 and 26 are of a clear material such as photographic film, then lines 30 are entirely visible. This, is however optional.

A movable member or cursor 32 is mounted upon body 12 and is held in place by flanges 34 and 36 which mate into grooves on the upper and lower edges of body 12. Cursor 32 is made of a transparent material such as a clear plastic so that traces 24 and 28 may be clearly seen through it. A vertical index line 38 is marked on the surface of cursor 32 to permit vertical correlation of points on curves 24 and 28.

When the correlation between curves 24 and 28 is to be determined, a horizontal reference line is drawn through each curve. Preferably this reference line passes through the average or mean value of the curve. Thus reference line 40 is drawn through test graphical trace 24 at substantially the mean value of the graphical trace. Similarly horizontal reference line 42 is drawn through reference graphical trace 28 at substantially the mean value of that graphical trace. Paper strip 22 is then mounted upon the surface or slider 16, and the position of slider 16 is adjusted to a position of apparent correlation of graphical traces 24 and 28. Of course it might not be possible to determine the best correlation position, and in such instances the correlation coefficient can be determined by the present method at two or more positions of good correlation, and then the best correlation position will be known from these results. Additionally, if desired, the test graphical trace can be divided into segments, and the correlation of each segment determined, instead of determining the correlation of the test trace as a whole. The segments into which the test trace is divided could overlap, if desired.

In the representative example depicted in FIG. 1, slider 16 is adjusted to a position at which there is a high degree of correlation between graphical traces 24 and 28. Cursor 32 is then moved to a position in which index line 38 is aligned with the reference point established by the vertical line 30 closest to the left edge of graphical trace 24. An observation is then made of the positions of traces 24 and 28 with respect to their reference lines 40 and 42. Either both traces 24 and 28 lie above their respective reference lines at the point at which index line 38 crosses them, or they both lie below their respective reference lines, or one lies above its reference line and the other below its reference line. Cursor 32 is then moved to align index line 38 with the next reference point 30 along the graphical trace 24. Another observation is made of the positions of graphical traces 24 and 28 with respect to their reference lines 40 and 42. This process is repeated until observations of the positions of the graphical traces have been made at each reference point 30 along the length of graphical trace 24.

If at a given reference point 30 both graphical trace 24 and graphical trace 28 are displaced above their respective reference lines, then they are deemed to correlate at that location. Likewise, if both graphical traces 24 and 28 are displaced below their respective reference lines 40 and 42 they are deemed to correlate at that position. However, if one graphical trace is displaced above its reference line and the other below its reference line, then the two graphical traces 24 and 28 are deemed not to correlate at that particular reference point. A count is made of the number of reference points 30 at which graphical traces 24 and 28 correlate. Likewise a count is made of the number of reference points at which graphical traces 24 and 28 do not correlate. If $N_1$ represents the number of reference points 30 at which the graphical traces 24 and 28 correlate by either both lying above their respective reference line or both lying below their respective line, and $N_2$ represents the number of reference points 30 at which graphical traces 24 and 28 do not correlate because one of the graphical traces lies above its reference line and the other graphical trace lies below its reference line, then the correlation number R is given by $$R(x, y) = \frac{N_1 - N_2}{N_1 + N_2}$$

From this value of R, the correlation coefficient of the two probability variables $x$ and $y$ is found from the relation $$\rho(x, y) = \sin\left[\frac{\pi}{2} R(x, y)\right]$$

or $$\rho(x, y) = \sin\left[\frac{\pi(N_1 - N_2)}{2(N_1 + N_2)}\right]$$

A more complete derivation of this relation is found in the paper "A Simple Method for Calculating the Correlation Coefficients" by Yoshibumi Tomoda, Journal of Physics of the Earth, vol. 4, No. 2 (1956).

When the two traces are in perfect correlation, they have no displacements in opposite phase, and therefore $N_2$ is zero. In such a case the correlation coefficient $\rho(x, y)$ is equal to +1.0. At the opposite extreme, if the traces are in perfect anti-correlation, all of the displacements are in opposite phase, and therefore $N_1$ is 0. In such a case the correlation coefficient equals −1.0. Thus the correlation coefficient varies from +1.0 to −1.0 depending upon the degree of correlation of the two graphical traces, the same as the normalized correlation coefficient determined by complex mathematical methods.

The degree of significance of the correlation coefficient depends upon the number of reference points 30 over which the correlation is made. Thus, the more closely spaced the reference points 30 are, the greater the significance of the correlation coefficient. Likewise, a more significant correlation coefficient can be obtained for a long trace than for a short one.

Although the present invention has been described with respect to a preferred embodiment and method, obviously numerous modifications and variations could be resorted to and still be within the scope of the invention which is defined more particularly by the claims.

What is claimed is:

1. A method of determining a correlation coefficient $\rho(x, y)$ of two graphical traces $x$ and $y$ comprising the steps of:
    (a) locating a horizontal reference line through each of said traces;
    (b) placing said traces in vertical juxtaposition;
    (c) locating a plurality of equispaced reference points along said traces;
    (d) determining the number $N_1$ of said reference points at which the two traces are displaced in the same direction from their respective reference lines;
    (e) determining the number $N_2$ of said reference points at which the two traces are displaced in opposite directions from their reference lines; and
    (f) calculating the correlation coefficient of said two traces in accordance with the relation $$\rho(x, y) = \sin\left[\frac{\pi(N_1 - N_2)}{2(N_1 + N_2)}\right]$$

2. The method of claim 1 in which each said horizontal reference line is located through the mean value of its respective trace.

3. The method of claim 1 further including the step of adjusting the vertical alignment of said traces to a position of apparent correlation prior to determining $N_1$ and $N_2$.

4. Apparatus for determining correlation between a reference graphical trace and a sample graphical trace, each trace having a reference line, by locating a plurality of equispaced reference points along said graphical traces to permit determination of the correlation of said graphical traces relative to their respective reference lines at each said reference point, whereby a correlation coefficient can be calculated from the results of said determinations, said apparatus comprising:
    (a) a reference graphical trace;
    (b) holding means for holding said reference graphical trace and said sample graphical trace in juxtaposition comprising a base member for holding one of said traces and a slider member mounted on said base member in a slideable manner for holding the other of said traces adjacent to said one trace, whereby the alignment of said traces can be adjusted to a position of apparent correlation; and
    (c) locating means comprising a plurality of equispaced reference points on said base member.

5. Apparatus as claimed in claim 4 in which said base member comprising an elongated body having a recess formed in one surface and throughout the length thereof, said recess having grooves formed on the sides thereof, and in which said slider member comprises an elongated body slidably mounted within said recess and having flanges which mate with said grooves to hold said slider member within said recess.

6. Apparatus as claimed in claim 4 further comprising a cursor slidably mounted on said base member and having an index line overlaying both said traces.

7. Apparatus as claimed in claim 4 in which said sample graphical trace comprises a seismic data trace.

References Cited

UNITED STATES PATENTS

| 2,207,375 | 7/1940 | Friedell | 235—64.7 |
| 2,348,411 | 5/1944 | Petty. | |
| 2,359,837 | 10/1944 | Freedlander | 235—70 |
| 2,455,522 | 12/1948 | Ringler | 235—70 X |
| 2,599,861 | 6/1952 | Poole. | |
| 2,977,680 | 4/1961 | Halverson. | |

WILLIAM D. MARTIN, Jr., Primary Examiner

U.S. Cl. X.R.

33—107, 235—70